March 23, 1965 J. A. BALDWIN, JR., ETAL 3,175,042

MONITORING GATE CIRCUIT

Filed May 4, 1960 2 Sheets-Sheet 1

INVENTORS J. A. BALDWIN, JR.
H. F. MAY

BY [signature]

ATTORNEY

INVENTORS J. A. BALDWIN, JR.
H. F. MAY
BY
ATTORNEY

United States Patent Office 3,175,042

Patented Mar. 23, 1965

3,175,042

MONITORING GATE CIRCUIT

John A. Baldwin, Jr., Murray Hill, and Harold F. May, Basking Ridge, N.J., assignors to Bell Telephone Laboratories, Incorporated, New York, N.Y., a corporation of New York Filed May 4, 1960, Ser. No. 26,758
14 Claims. (Cl. 179—18)

This invention relates to monitoring and control apparatus and more particularly to such apparatus employing magnetic principles.

The supervision of electrical circuits that are subjected to various forms of interference, whether such circuits include the lines of a telephone system or of a telemetering, sampling, distribution or control system of another sort, presents many problems of an engineering and economic nature. Where large numbers of electrical circuits are to be supervised it is advantageous to associate each circuit with a corresponding terminal of a periodically scanned array of terminal points. Under appropriate system requirements, it may be necessary for the scanning apparatus either to distinguish between discrete line conditions or to follow and faithfully report the signal variations appearing at the line terminals. Telephone line supervision is an example of the former while telemetering applications illustrate the latter.

In a circuit for determining the state of telephone lines, for example, it is desirable that supervisory apparatus recognize and respond to the subscriber's requests both for service, indicated by his lifting the telephone receiver from the switchhook (hereinafter called the off-hook condition) and for the termination of service, indicated by his replacing the receiver on the switchhook (the on-hook condition). These actions respectively close and open a metallic path to the central office battery supply. In conventional systems of this sort, the presence of line current is used to actuate a relay which is released during the no-current, on-hook condition. Under the conditions of inductive interference and leakage normally encountered on long lines it becomes necessary to distinguish between current magnitudes which are either above or below particular threshold values established on the basis of both system operating limitations and experience. While sensitive relays for such work provide fair resolution and immunity from interference, they employ delicate and expensive moving parts, are slow in operation and are not readily adaptable for use in compact, high-speed scanning supervisory arrays.

Previous high-speed supervisory circuits, such as the line circuit scanner described in the November 1958 issue of the Bell System Technical Journal at page 1383 et seq. have distinguished between off- and on-hook conditions by responding to changes in potential developed across one or more resistances in series with the line circuit. Because of the susceptibility of telephone lines to longitudinal circuit induction, i.e., induced voltages which tend to send currents to ground through any impedance at the line terminals, such prior supervisory circuits operating in response to line voltage conditions require numerous balancing and filtering components to provide acceptable performance.

In addition to being immune from interfering signals appearing on the monitored line, a practical supervisory circuit must exhibit both high sensitivity and rapid response without making the monitored line noisy or disturbing its balance with respect to ground. Scanning arrangements which associate with the supervised line a dynamic interrogating circuit rather than a merely passive indicating circuit require particularly strict isolation between the supervised line and the dynamic monitoring circuits to prevent the introduction of noise upon the supervised line. Such isolation has heretofore required the use of additional components.

Isolation, both electrical and mechanical, also is desired so that the expensive interrogation and detection circuits of the scanning apparatus may be protected from temporary high voltage surges caused by lightning. Should the carbon block protectors fail adequately to function, it is desirable that burn-out damage be confined to low-cost, easily replaced elements.

Some additional complexity and expense is occasioned by the use of prior art supervisory circuits because line and trunk circuits exhibit different susceptibilities to interference and also because small though not inconsiderable deviations in voltage levels exist among subscriber's lines. Thus, different types of supervisory circuits are required to be stocked because the relatively simple supervisory circuits appropriate for supervision of trunk circuits are unsatisfactory for supervision of the relatively noisier line circuits. On the other hand, the finite differences in line parameters have required that individual adjustments of the supervisory circuits be made for each installation.

While monitoring and control functions are of considerable importance in telephone systems, as indicated above such functions are of equal interest in telemetering, sampling and control systems, particularly where system considerations dictate that the sensing element possess special control characteristics. Thus, it is often of particular importance that high gain, sensitivity and linearity of response be obtainable without unduly sacrificing either speed of operation or circuit simplicity. On the other hand, in other sampling applications it may be desirable to distinguish between signals nearly equal in amplitude, a requirement which dictates a knee-shaped rather than a linear control characteristic.

Some prior art metering devices have employed a plurality of magnetic cores, but these have been particularly subject to slow operation (large control circuit time constant) because of the need to have pairs of control and load windings connected to produce a series opposition effect in the control circuit thereby preventing the control winding from continuously acting as a transformer secondary. It is, of course, apparent that additional windings materially increase the inductance, and hence the time constant of the control circuit.

The so-called "D.C. transformer law" is applicable to such prior art devices and determines that the ampere-turns based on the average value of control circuit current must equal the ampere-turns based on the average value of load circuit current. Since the control circuit and the load circuit are physically positioned on the same magnetic core and closely linked by at least one low reluctance flux path, substantially all the flux due to the average value of load current links the control winding. The control circuit time constant, which may be expressed as the ratio of control circuit inductance (flux linkages per unit current) to control circuit resistance is accordingly affected not only by the flux linkages due to the self-inductance of the above-mentioned additional control winding turns but also by the additional flux linkages due to the load current. Thus, increased dynamic load current (larger gain) is achieved at the expense of larger control circuit time constant. While prior art two-core magnetic amplifiers with acceptable gain-to-time-constant ratios are known, their performance levels have been achieved only by resorting to self-saturating or external feedback arrangements requiring unilateral impedance elements and/or additional windings.

In the conventional single core magnetic amplifier, similar considerations are also present. Even with the use of unilateral impedances in both control and load circuits the control circuit is coupled to the gate circuit both during the gating half cycle until the core saturates as well as during the reset half cycle until the reset flux level is established. When the elements in the control circuit present a closed path for induced current there is a flux associated with the induced current which, in accordance with Lenz' law, opposes the flux change responsible for the induced current and thus decreases the rate at which flux can be switched. In conventional single core magnetic amplifiers an A.C. control circuit voltage whose instantaneous polarity opposes the voltage induced in the control circuit winding of the saturable core is necessary to prevent the control circuit loading down the gate circuit during the unsaturated portion of the gating half cycle. When the induced voltage becomes very small upon core saturation during the second half of the gating half cycle, a properly poled control circuit diode is required to prevent control circuit current due tot he A.C. control circuit voltage.

Accordingly, it is an object of the present invention to provide a simple and efficient supervisory gating circuit having both high sensitivity and fast response.

It is another object of the present invention to provide a monitoring circuit including elements having readily determinable control characteristics.

It is a further object of the present invention to provide an economical, high-speed, line sampling circuit having a high signal-to-noise ratio, particularly in regard to longitudinal circuit induction.

It is still another object of the present invention to permit high amplitude interrogation of a signal responsive magnetic circuit without disturbing the signal input.

In accordance with the principles of the present invention, a sensitive fast response sampling apparatus for distinguishing signal conditions in each of one or more supervised circuits is obtained by providing each circuit with a bipolar magnetic member which has at least one interpolar closed flux path integral with the member and which exhibits remanent switching characteristics, and by dynamically scanning each remanent path to ascertain the effect upon its switching characteristics of the signal conditions of the associated supervised circuit. A control flux proportioned by the signal conditions in a respective supervised circuit is admitted, in accordance with the demagnetization properties exhibited by the bipolar member, to the interpolar region containing the closed flux path and constricts the cross section of the path effective to exhibit remanent switching. The geometry of the remanent switching paths in the interpolar region is predetermined together with the demagnetization factor of the member to define a desirable unilateral control characteristic whereby changes in signal conditions in the supervised circuits are effective to modify the closed path flux, whereas changes in the closed path flux are not effective to react upon the supervised circuits. The remanent switching properties are stabilized with respect to dimensional tolerances in one illustrative embodiment by locating a plurality of the integral closed flux paths about apertures transverse to the polar axis of the member.

In one illustrative embodiment of the principles of the present invention an apparatus for monitoring telephone line circuit currents includes an elongated ferrite stick exhibiting a stripwise demagnetization characteristic. This characteristic is preselected together with a transverse aperture position to define a remanent flux path productive of a desired control characteristic according to which telephone line currents, corresponding to on-hook and off-hook conditions, respectively, couple and block interrogating signals between scanning pulser and detector circuits without interfering with the monitored circuit. Flux switching signals from the pulser are applied to a conductor threading the aperture to switch flux in the remanent path; the flux available for switching is controlled by the line current according to the flux switching threshold predetermined by the lateral eccentricity of the aperture with respect to the polar axis of the stick. A second conductor threading the aperture senses the flux changes produced by the interrogating signals and couples the corresponding induced voltage to the scanning detector.

In another illustrative embodiment the asymmetrical flux path effect productive of a desired knee-shaped remanent flux switching characteristic is obtained by positioning a pair of apertures in the interpolar region so that the inter-aperture spacing is less than the sum of certain aperture to edge dimensions and by inserting oppositely directed U-shaped conductors connected respectively to the pulser and detector through the apertures.

It is a feature of the present invention that a line circuit monitoring apparatus include a magnetic element having a region containing an enclosed scanned flux path subjected to a demagnetization effect for excluding flux in the scanned path from the line circuit.

It is another feature of the present invention that the magnetic element define a switchable remanent flux path in a portion of a nonremanent flux path for the unilateral monitoring of the latter path's magnetization level.

It is a further feature of certain embodiments of the present invention that a plurality of apertures be positioned in a bipolar magnetic strip to define a flux switching characteristic having accurately determinable inflections and intercepts.

It is still another feature of this invention that the magnetic element be elongated and be magnetized axially along its length by the condition of the circuit being scanned or monitored, the flux path for this axial magnetization including, however, an external air path portion of sufficient length relative to the length of the magnetic element so as to have a demagnetizing effect on the axial magnetization of the magnetic element even though the element be of a material exhibiting stable remanent states of magnetization. Further, in accordance with this feature of the invention, at least one aperture is provided through the magnetic element and transverse to the axial magnetization path to provide a second closed flux path, the remanent flux in this path not being destroyed by the axial demagnetization characteristic.

The foregoing and other objects and features may be more readily understood from the following detailed description and drawing, wherein.

Figure 1:
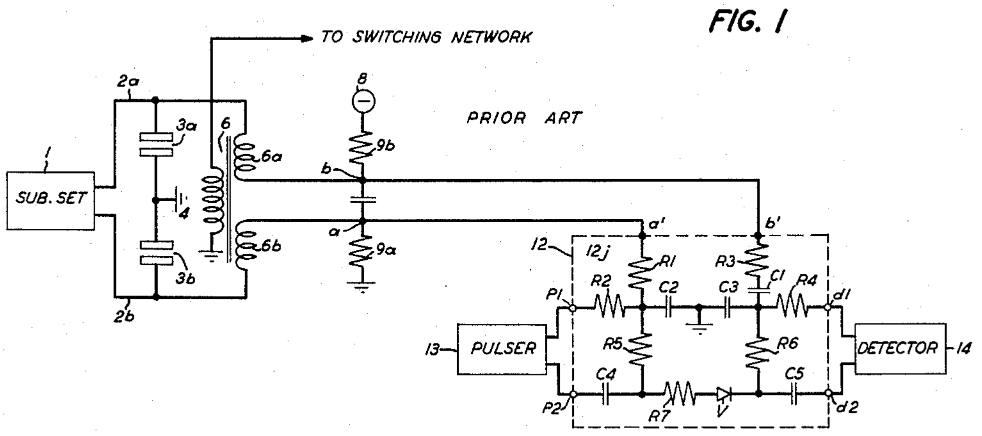
FIG. 1 shows a monitoring circuit of the prior art.

Referring now to FIG. 1, there is shown a supervisory apparatus of the prior art adapted for the high speed scanning of subscribers' lines in a telephone switching system. Each subscriber in the telephone system possesses a subset such as subset 1 which is connected to a corresponding pair of transmission lines 2*a* and 2*b*. Conventional carbon block lightning protection devices 3*a* and 3*b* connected between lines 2*a* and 2*b* provide a low impedance path to ground 4 when a predetermined breakdown potential is reached.

Primary windings 6*a* and 6*b* of transformer 6 provide talking battery current for lines 2*a* and 2*b* from battery 8 through battery feed resistors 9*a* and 9*b*. The loop current path for talking battery current is completed when the subset 1 is in the off-hook condition and may be traced from ground through resistor 9*a*, primary winding 6*b*, line 2*b*, subset 1, line 2*a*, primary winding 6*a* and resistor 9*b* to battery 8.

The additive voltage drops produced across battery feed resistors 9a and 9b by the loop current are monitored by bringing out terminals a and b of the loop to the corresponding set of input terminals a'–b' of periodically scanned array 12. Array 12 contains a corresponding pair of input terminals (not shown) for each loop circuit of the telephone system. Each such a' and b' terminal pair is associated with a diode transmission gate network 12j having commutator terminals p1–p2 for connection to pulse source 13 and commutator terminals d1–d2 for connection to detector 14. Pulser 13 and detector 14 are simultaneously switched by conventional commutator apparatus (not shown) to the corresponding terminals p1, p2, d1 and d2 of the transmission gate 12j associated with the corresponding pair of a' and b' terminals. Pulses applied by pulser 13 to terminals p1–p2 are transmitted by the diode transmission gate 12j to terminals d1–d2 when the line potential at terminals a'–b' (corresponding to the on-hook condition) unblocks diode V. With subset 1 in the off-hook condition, the line potential applied to terminals a'–b' is such that diode V is back-biased and pulses from source 13 are not transmitted to detector 14.

The function of the numerous resistors and capacitors and of the diode V is described in the above-mentioned Bell System Technical Journal article dealing with line circuit scanning and will be only summarized herein. Briefly these components are required to achieve acceptable isolation, signal-to-noise ratio and circuit balance. Thus capacitor C1 is required to block battery 8 voltage and to couple longitudinal voltages and dial pulses to the cathode of diode V. Capacitors C2 and C3 and resistors R1 and R3 together comprise a hit filter for protection against lightning and other noise voltages which may be picked up by the subscriber's loop circuit. Resistor R7 is inserted to equalize variations in diode forward resistance among the transmission gates and resistor R4 provides the D.C. return path for the diode V while R2 is required to provide balance to ground for A.C. signal components. R5 and R6 (in conjunction with R1 and R3) are provided for coupling the potential variations at terminals a'–b' to diode V. R1 and R3 offer a high impedance path compared to that of capacitors C2–C3 for pulses from pulser 13 thereby isolating pulser 13 from the lines 2a–2b.

Figure 2:
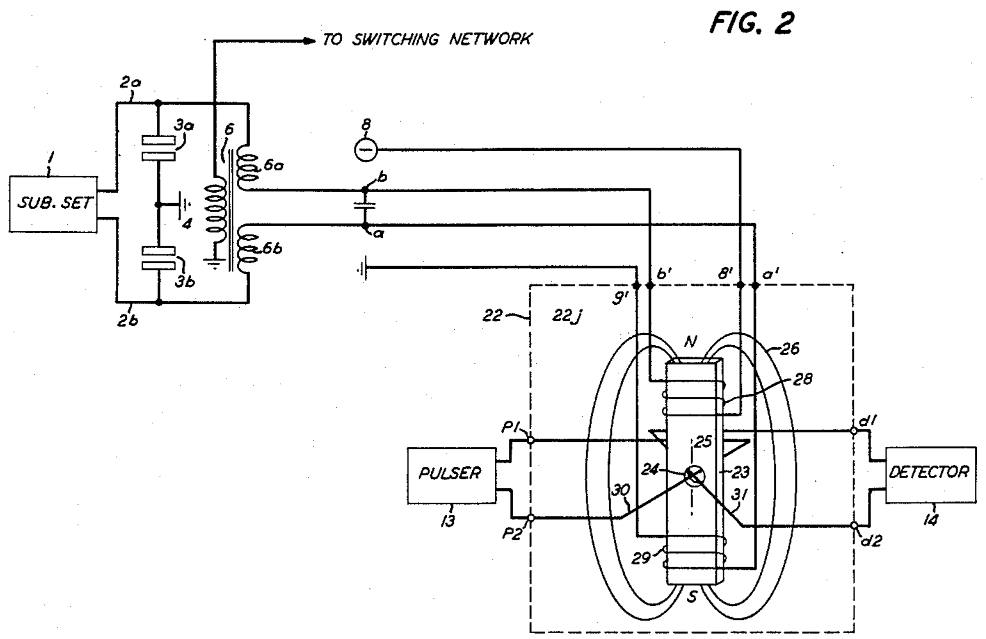
FIG. 2 shows the improved monitoring apparatus of one specific illustrative embodiment of the present invention.

In FIG. 2, there is shown a line terminal scanning and monitoring gate embodiment illustrative of the principles of the present invention. The periodically scanned array 22 contains for each line circuit a balanced monitoring gate circuit 22j for coupling pulses from commutated pulser 13 to commutated detector 14 in the on-hook condition and for blocking these pulses during the off-hook condition. Terminals a and b of the loop circuit are brought out to terminals a' and b' of array 22, and battery 8 and ground are brought out to terminals 8' and g', respectively. Each monitoring gate circuit 22j comprises an elongated ferromagnetic member 23 having pole forming ends N and S and an aperture 24 transverse to the member axis 25.

Figure 3:
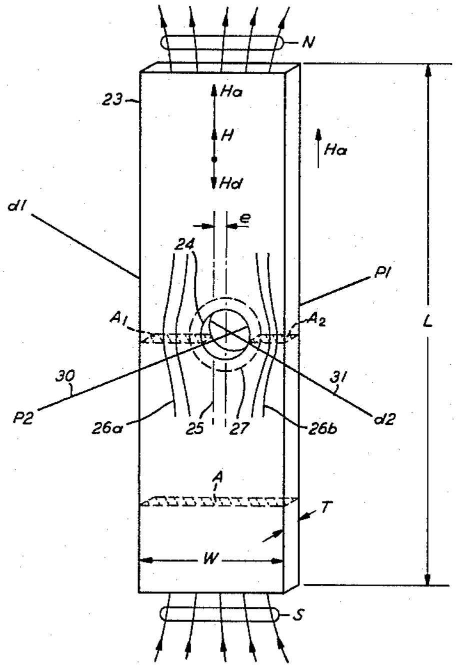
FIG. 3 shows an enlarged view of a portion of FIG. 2.

As shown more clearly in FIG. 3, within member 23 the aperture 24 defines a bifurcated flux path 26a–26b passing between the pole forming ends N and S and a closed flux path 27 passing circumferentially to the aperture. In the section of member 23 taken through aperture 24 both flux paths share the cross section areas A1 and A2. The ratio $A_1/A_2$ defines the lateral eccentricity of the aperture 24 with respect to the axis 25.

Flux path 27 is wholly contained within the ferromagnetic body of member 23 and accordingly exhibits switching characteristics determined by the inherent properties of the material comprising member 23 about the periphery of aperture 24. Advantageously, aperture 24 may be of circular cross section and member 23 may be constructed of any of the well-known magnetic materials exhibiting high remanence and low coercivity so that the flux path 27 is a cylindrical shell exhibiting a rectangular hysteresis characteristic.

On the other hand, the ferromagnetic portion of flux path 26a–26b terminates in the pole forming ends N and S of member 23 so that the switching characteristics of path 26a–26b are not immediately apparent from a consideration based solely upon the type of material comprising member 23. More particularly, the magnetic remanence properties characterizing the closed flux path 26 including the bifurcated flux path 26a–26b are quite distinct from those exhibited by the circumferential path 27, as will be hereinafter illustrated. Windings 28 and 29, FIG. 2, are positioned on member 23 and serially connected in the loop circuit to apply a magnetic field $H_a$ parallel to the axis 25 in accordance with the loop current. Windings 28 and 29 are energized by current from central office battery 8 when subset 1, in the off-hook condition, completes the loop circuit between lines 2a and 2b.

Pulser 13 is connected to the commutated terminals p1–p2 of monitoring gate 22j for an interval during the scanning of array 22 and applies alternate polarity switching signals to conductor 30 threading aperture 24 of member 23. Detector 14 is similarly connected to commutator terminals d1–d2 and conductor 31 which threads aperture 24. In the absence of the peripheral flux path 27, FIG. 3, provided by member 23, negligible coupling would be possible between conductors 30 and 31. However, the existence of the flux path 27 linking conductors 30 and 31 permits appreciable coupling to be obtained when the magnetic state of path 27 is such as to be amenable to switching by the pulses applied to conductor 30.

The ability of path 27 to support a switchable flux, and hence the degree of coupling between pulser 13 and detector 14 is determined by the magnetic state of bifurcated flux path 26a–26b, FIG. 3, and this magnetic state is controlled by the applied field $H_a$.

Due to the existence of the pole forming ends N and S, the actual magnetic field H within the flux path 26a–26b is proportional to the difference between the applied magnetic field $H_a$ and the demagnetizing field $H_d$ due to the poles. In addition, the demagnetizing field $H_d$ exerted at the ends of the bifurcated flux path 26a–26b precludes the transfer of flux from circumferential path 27 to the path 26a–26b linking windings 28 and 29, thereby isolating the dynamic interrogating circuit including pulser 13 from the subscriber's loop circuit.

Referring more particularly to FIG. 3, the value of the resultant magnetic field H in path 26a–26b may be approximated by assuming it to be uniform, so that:

$$H=H_a-H_d \tag{1}$$

Since the demagnetizing field $H_d$ is proportional to the longitudinal flux density M at the ends N and S, the above equation may be rewritten as:

$$H=H_a-DM \tag{2}$$

where D, the demagnetization factor, may be approximated by:

$$D=4\pi\frac{WT}{L^2}\left[\ln\frac{4L}{W+T}-1\right] \tag{3}$$

The longitudinal flux density or induction M is dependent upon the applied field $H_a$ as shown by the following approximations, wherein $H_c$ is the coercive force and $M_s$ the saturation induction of the material comprising member 13:

$$M=0, \qquad H_a\leq H_c \tag{4a}$$

$$M=\frac{H_a-H_c}{D}, \quad H_c\leq H_a\leq H_c+DM_s \tag{4b}$$

$$M=M_s, \qquad H_a\geq H_c+DM_s \tag{4c}$$

The longitudinal control flux $\varphi$ in path 26a–26b may be approximated by $$\varphi=4\pi AM \tag{5}$$

where A is the cross-sectional area of the stick. On the other hand, the circumferential flux $\Delta\varphi$ available to be switched around the aperture 24 is limited by the cross-sectional area $A_2$ of the smaller constricted region and is given by:

$$\Delta\varphi=2A_2\cdot 4\pi M_s \quad (6)$$

For low values of loop current in windings 28 and 29, the longitudinal flux $\varphi$ in path 26a–26b will at first pass through the larger area $A_1$ and the switching flux $\Delta\varphi$ will remain constant until the longitudinal flux reaches the critical value $4\pi(A_1-A_2)M_s$. When this point has been passed the flux $\Delta\varphi$ which may be switched decreases with increasing longitudinal flux according to the relation:

$$\Delta\varphi=4\pi(A_1+A_2)M_s-\varphi \quad (7)$$

When the longitudinal flux $\varphi$ reaches the value $$4\pi(A_1+A_2)M_s$$

the area $A_2$ is completely saturated and flux coupling between conductors 30 and 31 is reduced to a negligible value.

The upper and lower limits of the loop current during off-hook and on-hook conditions require that the monitoring gate distinguish between two different levels of applied magnetic fields.

The relationship between $\Delta\varphi$ and $H_a$ due to loop current may be obtained by combining the above equations. The value of $H_a$ where $\Delta\varphi$ first starts to decrease with increasing field is defined as $H_1$ and is the field corresponding to the maximum acceptable loop current for the on-hook condition. Accordingly, $$H_1=H_c+\frac{A_1-A_2}{A}DM_s \quad (8)$$

(If the aperture 24 is laterally centered, $A_1=A_2$, this field is just the coercive force $H_c$). The value of the applied field $H_a$ at which the switching flux $\Delta\varphi$ vanishes is defined as $H_2$ and is the field corresponding to the minimum prescribed value of off-hook loop current:

$$H_2=H_c+\frac{A_1+A_2}{A}DM_s \quad (9)$$

Accordingly, $$\Delta\varphi=8\pi A_2M_s, \qquad H_a\leq H_1 \quad (10a)$$

$$\Delta\varphi=\frac{A}{D}(H_2-H_a), H_1\leq H_a\leq H_2 \quad (10b)$$

$$\Delta\varphi=0, \qquad H_a\geq H_2 \quad (10c)$$

The factor D is obtained by solving the equations for $H_1$ and $H_2$ whereby it is seen that:

$$D=\frac{A}{2A_2}\left[\frac{H_2-H_1}{M_s}\right] \quad (11)$$

Figure 4:
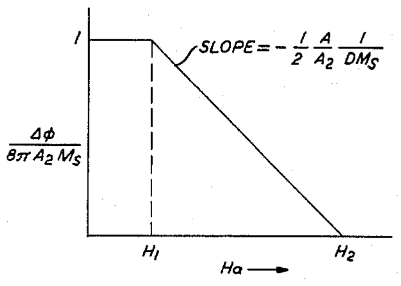
FIG. 4 shows the control characteristic of the apparatus of FIG. 2.

From this and the preceding Equation 3 for D the dimension W, L and T may be selected for appropriate $\Delta\varphi$ response. This relation is presented graphically in the switching characteristic of FIG. 4 which shows that the aperture 24 may advantageously be laterally displaced from the axis 25 to increase $H_1$ while leaving $H_2$ constant. Thus, by using a large $A/A_2$ ratio and a small demagnetizing factor a steep slope is obtained and two values of $H_a$ which are not very different may be clearly distinguished. On the other hand, control of output coupling by a small magnitude applied field may be obtained by using a low-coercive-force material, a small $(A_1+A_2)/A$ ratio and a small demagnetizing factor.

Figure 5:
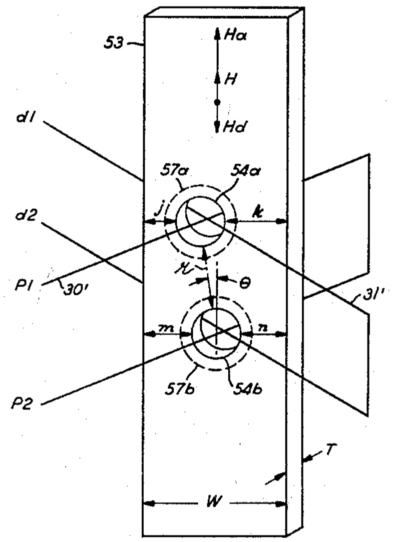
FIG. 5 shows an alternate embodiment to that of FIG. 3.

A monitoring gate having distinctive knee-shaped switching characteristics is obtained by the substitution of member 53, FIG. 5, for the member 23 of FIG. 1. The member 53 has two apertures 54a and 54b through each of which electrical conductors 30′ and 31′ are passed. A current pulse applied to conductor 30′ by pulser 13 will produce a clockwise magnetization in flux path 57a about aperture 54a and a counterclockwise magnetization in flux path 57b about aperture 54b. In the absence of an applied field $H_a$, the switchable flux due to energizing conductor 30′ is:

$$\Delta\varphi=8\pi rTM_s \quad (12)$$

where $r$ is the minimum interaperture distance between apertures 54a and 54b.

A longitudinal flux $\varphi$, given by $$\varphi=T(W-r-d)4\pi M_s \quad (13)$$

where $d$ is the diameter of apertures 54a and 54b, may be passed through member 53 without constricting the flux paths 57a–57b. A longitudinal flux in excess of this magnitude decreases the effective diameters of the flux paths 57a–57b proportionately and hence decreases the amount of flux which may be switched by an alternating-polarity interrogation current pulse applied to conductor 30′. The switching flux will reach zero when the longitudinal flux completely saturates the material on both sides of the holes. This occurs when:

$$\varphi=T(W-d)\cdot 4\pi M_s \quad (14)$$

Combining the above relationships, the values for $H_1$ and $H_2$ are obtained as:

$$H_1=H_c+\frac{W-r-d}{W}DM_s \quad (15a)$$

$$H_2=H_c+\frac{W-d}{W}DM_s \quad (15b)$$

and correspondingly, the flux available for switching as a function of applied field is given by:

$$\Delta\varphi=8\pi rTM_s, \qquad H_a\leq H_1 \quad (16a)$$

$$\Delta\varphi=8\pi WT\frac{H_2-H_a}{D}, H_1\leq H_a\leq H_2 \quad (16b)$$

$$\Delta\varphi=0, \qquad H_2\leq H_a \quad (16c)$$

Apertures 54a and 54b may be laterally displaced without affecting these results so long as the effective flux paths 57a–57b do not intersect the sides of member 53, i.e., so long as $W>r+D$ and $\theta$, the angle between the longitudinal axis of member 53 and $r$, is equal to zero.

Figure 6:
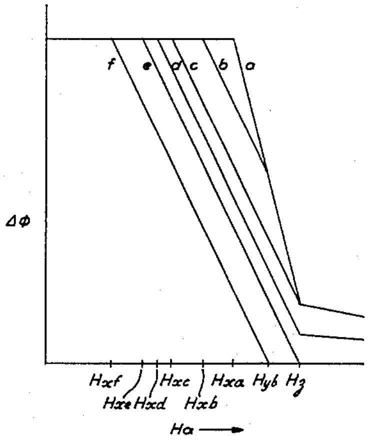
FIG. 6 shows the range of control characteristics for the embodiment depicted in FIG. 5.

FIG. 6 shows the dependency of switchable flux $\Delta\varphi$ as a function of applied field $H_a$ for various positions of aperture 54a relative to that of aperture 54b, i.e., $m$, $n$, $r$ and W are held constant and $j$ and $k$ are considered to be varied with $\theta$. $H_x$ is the value of $H_a$ at which the rate of change of $\Delta\varphi$ with $H_a$ undergoes a first change, $H_y$ is the value of $H_a$ at which it undergoes a second change, and $H_z$ is the value of $H_a$ at which it undergoes a third change. Curve $a$ illustrates that for axially located apertures, i.e., $\theta=0$, $H_x=H_y$. As $\theta$ increases in counterclockwise sense, $H_x$ moves to the left and $H_y$ to the right while $H_z$ remains unchanged, as shown in curve $b$. When $k=n+r$, $H_y=H_z$ (curve $c$) the more steeply descending portion of the curve vanishes. As $\theta$ increases further the residual flux $\Delta\varphi$ at $H_z$ decreases until $j=m-r$ when $\Delta\varphi$ is completely eliminated as shown by curves $d$ and $e$. As $\theta$ continues to increase the inclined segment moves to the left maintaining its original slope until it reaches its terminal position at $\theta=90°$ (curve $f$). For $j\geq m-r$ and $k\geq n+r$ (FIG. 6, curves $c$ through $e$):

$$H_x=H_c+H_d\frac{j+n-r}{W} \quad (17a)$$

$$H_y=H_c+H_d\frac{m+n}{W} \quad (17b)$$

and $$\Delta\varphi=8\pi rTM_s, \qquad H_a\leq H_x \quad (18a)$$

$$\Delta\varphi=8\pi rTM_s\left[1+\frac{W}{2r}\frac{(H_x-H_a)}{EM_s}\right], H_x\leq H_a\leq H_y \quad (18b)$$

$$\Delta\varphi=4\pi TM_s(j-m+r), \qquad H_a=H_y \quad (18c)$$

and $\Delta\varphi$ declines slowly as $H_a$ is increased beyond $H_2$. For $j \leq m-r$ (FIG. 6, curves *e* and *f*):

$$H_x = H_c + DM_s \frac{j+n-r}{W} \quad (19a)$$

$$H_y = H_c + DM_s \frac{j+n+r}{W} \quad (19b)$$

and $$\Delta\varphi = 8\pi r T M_s, \qquad H_a \leq H_x \quad (20a)$$

$$\Delta\varphi = 8\pi r T M_s \left[1 + \frac{W}{2r} \frac{(H_x - H_a)}{DM_s}\right], \quad H_x \leq H_a \leq H_y \quad (20b)$$

$$\Delta\varphi = 0, \qquad H_y \leq H_a \quad (20c)$$

Therefore, in accordance with our invention, the closed remanent flux path which is included in the axial nonremanent flux path of the elongated magnetic member may be defined either by a single aperture, which may be offset from the axis of the magnetic member, or by a pair of apertures dependent on the desired response and characteristic of the monitoring or sampling gate. In each instance, however, isolation is assured between the circuits associated with the two flux paths and the various other advantages set forth hereinbefore may be obtained.

It is further to be understood that the above-described arrangements are illustrative of the application of the principles of the invention. Numerous other arrangements may be devised by those skilled in the art without departing from the spirit and scope of the invention.

What is claimed is:

1. Apparatus for monitoring a predetermined range of circuit current comprising a magnetic element of rectangular hysteresis loop material, said element having remanent and nonremanent flux paths, said remanent path lying substantially wholely within said element and said nonremanent path having at least one portion thereof lying substantially outside said element, said nonremanent path embracing said remanent path, a winding connected in said circuit, said winding being axially aligned with said nonremanent path to develop therein a saturation magnetization during the continuance of at least one value of said circuit current, first and second conductors transverse to said nonremanent path and linking said remanent path, means connected to said first conductor for switching the flux in said remanent path in the absence of said current developing said saturation magnetization, and means connected to said second conductor for detecting said flux switching in said remanent path immediately preceding and following said one value of circuit current developing said saturation magnetization.

2. A monitoring apparatus according to claim 1 wherein said magnetic element exhibits a demagnetization factor sufficient to prevent the establishment of a remanent saturation flux in said nonremanent path following said one value of circuit current given by:

$$\frac{A}{2A_2} \frac{(H_2 - H_1)}{M_s}$$

where the factor $A/A_2$ is the ratio of maximum to minimum cross sectional area of said element, $(H_2 - H_1)$ is the difference between the value of said axial field at which said switching in said remanent path is first affected and the value of said axial field at which said switching is eliminated by said axial field, and $M_s$ is the saturation magnetization of said element.

3. A monitoring apparatus according to claim 1, wherein said magnetic element includes a first and a second aperture separated from each other by no more than the sum of either of the two distances $j+n$ and $m+k$ where $j$ and $k$ are the minimum lateral distances from opposite sides of said first aperture to a corresponding edge of said element and where $m$ and $n$ are the minimum lateral distances from opposite sides of said second aperture to a corresponding edge of said element.

4. A supervisory circuit comprising an integral ferromagnetic member defining a first and at least a second magnetic path embraced by said first path, said first path exhibiting sufficient demagnetization characteristics to preclude the establishment therein of remanent saturation magnetization and said second path exhibiting remanence characteristics, line circuit means operative selectively to magnetize said first path, interrogation circuit means for switching the remanent state of said second path, and detector means associated with said second path for detecting the extent to which said remanent state is switched when said line circuit means is operated.

5. A magnetic monitoring apparatus comprising a magnetizable member adaptable to exhibit magnetic remanence properties, a first aperture defining in said member a remanent flux path peripheral to said aperture, a second aperture defining in said member a remanent flux path peripheral to said second aperture and tangential to said first-mentioned path, demagnetization means including said member for excluding the flux in said remanent paths from a linear dimension of said member transverse to said apertures, and means for applying a magnetic field along said dimension to constrict said peripheral paths.

6. In a telephone line circuit system a pulser, a detector and a monitoring array having a gate circuit associated with each line circuit of said system for coupling said pulser to said detector during an on-hook condition and for decoupling during an off-hook condition comprising a line current coil and an elongated magnetic strip associated with each said line circuit, said magnetic strip being longitudinally subjected to the field produced by said coil and having a pair of transverse apertures defining a coupling path for an on-hook line current producing a field less than:

$$H_c + \frac{W-r-d}{W} DM_s$$

and no coupling path for an off-hook line current producing a field greater than:

$$H_c + \frac{W-d}{W} DM_s$$

where $M_s$ is the saturation magnetization, $H_c$ is the coercive force, D the demagnetization factor and W the width of said strip and where $d$ is the diameter of and $r$ the minimum separation between each of said apertures.

7. A monitoring gate circuit comprising a magnetic member of a ferromagnetic material capable of maintaining a saturation magnitude remanent flux about at least one closed path therein, said member being elongated and thereby having a longitudinal flux path extending between the ends of the elongated dimension of said member, said longitudinal flux path thereby giving rise to first and second magnetic poles at said ends respectively, said poles precluding the maintenance of a remanent saturation flux in said longitudinal path, aperture means bifurcating said path, conductor means for directing a remanent magnetic flux in said member peripherally to said aperture means, pulse means connected to said conductor for switching the direction of said magnetic flux, flux source means including said magnetic poles for selectively magnetizing said path, and detector means coupled to said aperture.

8. A monitoring gate circuit according to claim 7 wherein said flux source means comprises a pair of line circuit coils longitudinally coaxial with said member and disposed at opposite peripheral sides of said aperture means.

9. A monitoring gate circuit according to claim 8 wherein said aperture means comprises a pair of longitudinally centered holes transverse to the axis of said poles, wherein said conductor means comprises a first U-shaped wire threading said holes, and wherein said detector means is connected to a second U-shaped wire threading said holes oppositely to said first wire.

10. In a proportional sampling gate a magnetic element exhibiting a stripwise demagnetization factor, means for applying a stripwise field to said element, and a plurality of apertures in said element having peripheral rim regions exhibiting a remanent switching flux proportional to said field according to the relationship:

$$\Delta\varphi = 8\pi W T\left[\frac{H_2 - H_a}{D}\right]$$

for $H_a$ greater than $$H_c + DM_s\frac{(W-r-d)}{W}$$

and less than $H_2$, where $$H_2 = H_c + DM_s\frac{(W-d)}{W}$$

$H_a$ is the magnitude of said applied field, $\Delta\varphi$ is said switching flux, W is the width, T the thickness, D the demagnetization factor, $M_s$ is the saturation magnetization and $H_c$ the coercive force of said element and where $d$ is the diameter of and $r$ the minimum separation between said apertures; $r$ being less than $(W-d)$.

11. A monitoring gate circuit comprising an elongated magnetic member of a material exhibiting stable remanent states of magnetization, means for magnetizing said member axially along its length in a path including said length and a sufficient air path external to said member that said axial flux path in said member is non-remanent, said member having at least one aperture therethrough transverse to said axial flux path, and sensing and detecting means extending through said aperture for switching the state of a remanent flux path encompassing said aperture, said remanent flux path being included in said non-remanent axial flux path.

12. A monitoring gate circuit in accordance with claim 11 wherein said aperture is asymmetrically positioned with respect to said axial flux path.

13. A monitoring gate circuit in accordance with claim 11 wherein said member has a pair of apertures extending through said member transverse to said axial flux path, said sensing means extending oppositely through said apertures so that said remanent flux paths around said apertures coincide between said apertures.

14. A monitoring gating apparatus comprising an elongated magnetic member of a material capable of exhibiting remanent saturation flux switching properties and having at least one aperture therein, said member being axially elongated to define a first flux path having non-remanent flux properties, first conductor means for applying a magnetic field to said first flux path in the same direction on both sides of said aperture, second conductor means threading said aperture for switching remanent saturation flux in a second flux path peripheral of said aperture, said second flux path defining a remanent path, and detector means coupled to said aperture for detecting flux changes in said second flux path.

References Cited by the Examiner

UNITED STATES PATENTS

| | | | |
|---|---|---|---|
| 2,805,407 | 9/57 | Wallace | 340—174 |
| 2,938,129 | 5/60 | House | 307—88 |
| 2,976,472 | 3/61 | Newhall et al. | 340—174 |
| 3,024,447 | 3/62 | Abbott | 340—174 |

OTHER REFERENCES

"The Transfluxor—A Magnetic Gate with Stored Variable Settings," by Rajchman et al., RCA Review, June 1955, pages 303–311.

ROBERT H. ROSE, *Primary Examiner.*

L. MILLER ANDRUS, WILLIAM C. COOPER, *Examiners.*